United States Patent [19]

Hashimoto

[11] Patent Number: 4,494,642
[45] Date of Patent: Jan. 22, 1985

[54] CLUTCH DISC

[75] Inventor: Yasuyuki Hashimoto, Katano, Japan

[73] Assignee: Kabushiki Kaisha Daikin Seisakusho, Neyagawa, Japan

[21] Appl. No.: 347,157

[22] Filed: Feb. 9, 1982

[30] Foreign Application Priority Data

Feb. 13, 1981 [JP] Japan ............................ 56-20510

[51] Int. Cl.³ ............................................. F16D 3/14
[52] U.S. Cl. .............................. 192/106.2; 192/70.17; 464/68
[58] Field of Search ............... 192/70.17, 106.1, 106.2; 464/63, 68, 81

[56] References Cited

U.S. PATENT DOCUMENTS

| 3,101,600 | 8/1963 | Stromberg | 464/63 |
| 3,266,271 | 8/1966 | Stromberg | 192/106.2 |
| 3,534,841 | 10/1970 | Schneider et al. | 464/68 X |
| 4,185,728 | 1/1980 | Gatewood | 192/106.2 |

FOREIGN PATENT DOCUMENTS

| 2814240 | 5/1978 | Fed. Rep. of Germany | 192/106.2 |
| 55-97542 | 7/1980 | Japan | 192/106.2 |
| 2052683 | 1/1981 | United Kingdom | 464/68 |

Primary Examiner—Rodney H. Bonck
Assistant Examiner—James J. Merek
Attorney, Agent, or Firm—Armstrong, Nikaido, Marmelstein & Kubovcik

[57] ABSTRACT

The present invention discloses a clutch disc comprising a splined hub, an inner flange projecting radially from the outer periphery of the hub, an outer flange arranged around and meshing with the inner flange with a circumferential space therebetween, a pair of sub-plates fixed to the outer flange, a weak torsion spring connecting the sub-plates and the inner flange, and a retaining plate and a clutch plate connected to the outer flange by strong torsion springs.

4 Claims, 4 Drawing Figures

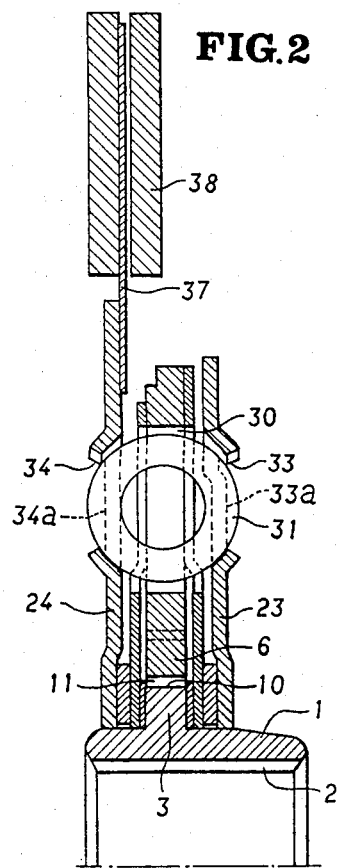
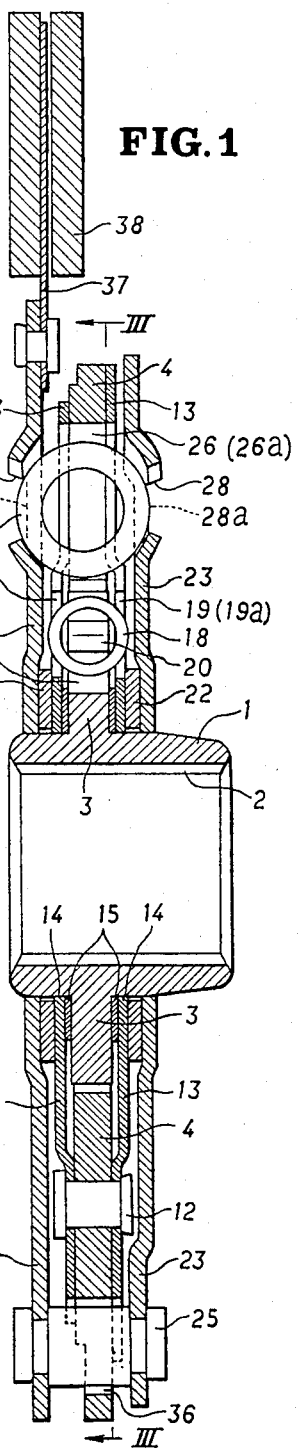

CLUTCH DISC

BACKGROUND OF THE INVENTION

The present invention relates to a clutch disc applicable to clutch discs for automobiles.

In a conventional type of a friction clutch disc, an annular flange formed integrally with a spline hub has many openings, recesses or the like, which a first torsion spring (for first torsion operation), second torsion springs and third torsion springs engage with, and stop pins pass through. These many openings and recesses are adjacent circumferentially to each other, which may reduce the strength of the flange. Further, the first torsion spring is compressed in the whole torsion area of the clutch disc. In other words, the first torsion spring starts to be compressed before the second and the third springs are compressed, and the maximum compressed length of the first spring is longest and corresponds to a maximum torsion angle of the clutch disc. Therefore, the compression rate of the first spring is very large, and the intended first torsion operation (operation in a small torsion angle area) is hard to obtain when such first springs having a large compression rate.

Accordingly, it is an object of the invention to provide an improved clutch disc, wherein openings for torsion springs are formed in a spline hub flange without reducing strength of the flange. It is another object to provide a clutch disc, wherein the compression rate of a first torsion spring is reduced, a maximum torsion angle is increased, and first hysteresis torque and second hysteresis torque are different in two or more steps of torsion characteristics.

SUMMARY OF THE INVENTION

The essence of the present invention is to provide a clutch disc comprising a splined hub, an inner flange projecting radially from the outer periphery of the hub, an outer flange arranged around and meshing with the inner flange with a circumferential space therebetween, a pair of sub-plates fixed to the outer flange, a weak torsion spring connecting the sub-plates and the inner flange, and a retaining plate and a clutch plate connected to the outer flange by strong torsion springs.

BRIEF DESCRIPTION OF THE DRAWINGS

FIG. 1 is a sectional view of a clutch disc according to the invention, and correspond to a sectional view taken along line I—I of FIG. 3;

FIG. 2 is a sectional view taken along line II—II of FIG. 3;

DETAILED DESCRIPTION OF THE PREFERRED EMBODIMENT

Figure 3:
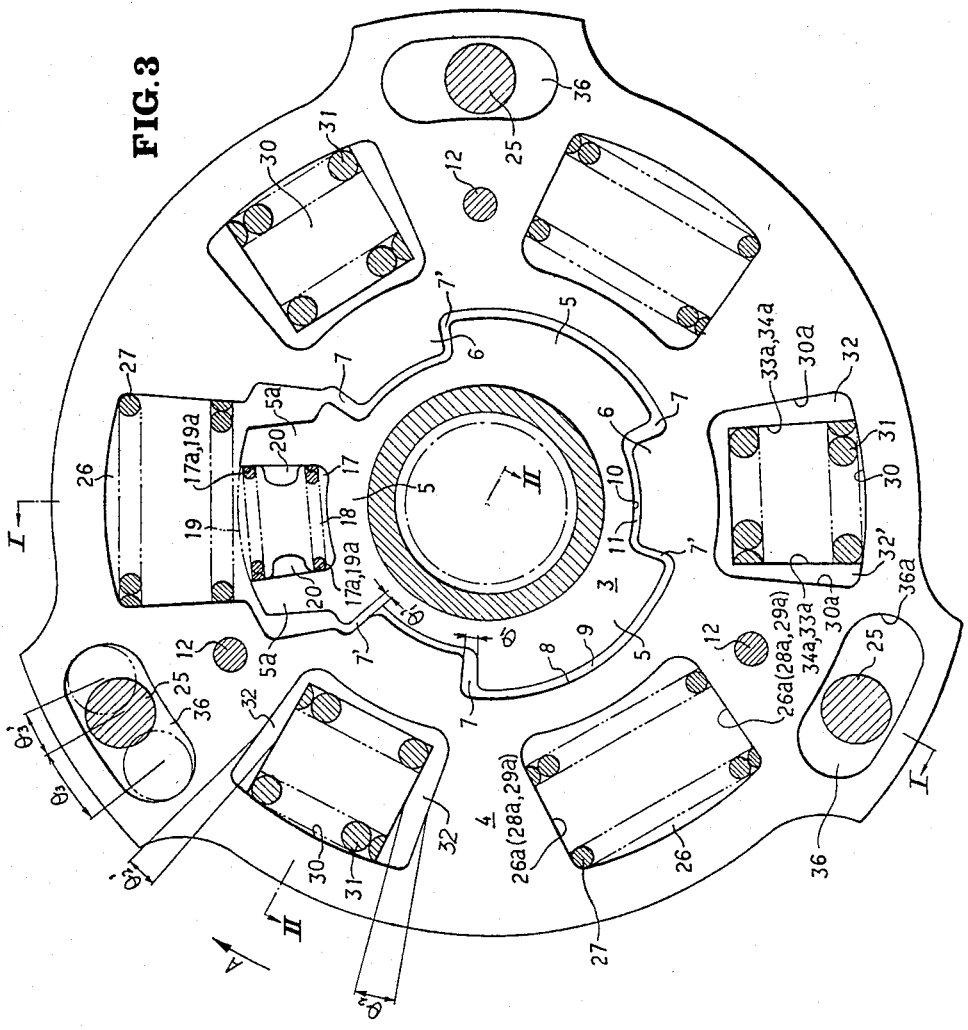
FIG. 3 is a sectional view taken along line III—III of FIG. 1.

Referring to FIG. 1, a spline hub 1 has inner splined teeth 2 which mesh with a horizontal output clutch shaft (not shown). The splined hub 1 has a radial flange 3 at its outer periphery. The flange 3 is integrally formed with the hub 1 and is surrounded by an annular flange 4. Both flanges 3 and 4 have same thickness and are arranged on the same vertical plane. As shown in FIG. 3, the inner flange 3 has outer teeth 5 at its outer periphery. The outer flange 4 has inner teeth 6 at its inner periphery. Both teeth 5 and 6 mesh with each other with circumferential spaces 7 and 7' therebetween. Radial spaces 9 are formed between the outer teeth 5 and hollow portions 8 between the teeth 6 of the outer flange 4. Radial spaces 11 are formed between the inner teeth 6 and hollow portions 10 between the teeth 5 and 5a of the inner flange 3. Radial length of the spaces 9 and 11 is determined to a fixed value by a pair of sub-plates 13 (see FIG. 1) which are fixed to both side faces of the outer flange 4 by sub-pins 12. Each sub-plate 13 is made of pressed sheet metal, and fitted to the outer periphery of the hub 1 at its inner periphery 14 without a space, so that both plates 13 support the outer flange 4 coaxially with the hub 1. Radially inner portions of both sub-plates 13 are pressed to both side faces of the inner flange 3 with wave springs 15 therebetween, respectively.

The inner flange 3 has one opening 17 (recess) at its radially outer portion, in which a pre-compressed first spring 18 is arranged. The center of the spring 18 extends along a circumference of the clutch disc. Diametrically opposite portions of the spring 18 project out of the sides of opening 17 and engage with openings 19 formed in the sub-plates 13. Both ends of the spring 18 are pressed to end faces 17a formed at both circumferential ends of the opening 17, and are also pressed to both end faces 19a formed at both circumferential ends of the openings 19. Each end face 17a has a projection 20 which is fitted into each end of the spring 18 and prevents the spring 18 from disengagement. As shown in FIG. 3, the opening 17 is formed by a recess at a radially extended portion of one outer tooth 5a of the inner flange 3. At the neutral position shown in FIG. 3, each end face 17a of the opening 17 and each end face 19a of the openings 19 occupy the same circumferential position, in other words, the adjacent faces 17a and 19a axially align with each other.

As shown in FIG. 1, axially outside faces of the sub-plates 13 opposite to the flange 3 are pressed to a retaining plate 23 and a clutch plate 24 with friction washers 22 (friction members) therebetween. Radially outer portions of both plates 23 and 24 are connected and pulled together by stop pins 25 in order to obtain the pressure against the washers 22. The fixed flange 4 and the sub-plates 13 have three openings 26 arranged on a common circle which is coaxial with the flange 4. Pre-compressed second springs 27 are arranged in the openings 26, respectively. Each spring 27 extends circumferentially with respect to the flange 4, and has portions which project out of the opening 26 and are fitted in openings 28 and 29 formed in the plates 23 and 24. As shown in FIG. 3, end faces 26a, 28a and 29a at both circumferential ends of the openings 26, 28 and 29 are axially registered at the circumferential position, when the disc is in the neutral position. Thus, both ends of the second springs 27 are pressed to the end faces 26a, 28a and 29a at the neutral position.

The fixed outer flange 4 and the sub-plates 13 (FIG. 2) have three openings 30 arranged at the same circle as the openings 26 and between the adjacent two openings 26. As shown in FIG. 3, a third spring 31 is arranged in each opening 30 with circumferential spaces 32 and 32' between both ends of the spring 31 and end faces of each opening 30. As shown in FIG. 2, each spring 31 has portions which project out of the opening 30 and are pressed to end faces 33a and 34a of openings 33 and 34 formed in both plates 23 and 24, respectively.

The flange 4 and sub-plates 13 have openings 36 or recesses at their radially outer portions, through which said stop pins 25 pass with circumferential spaces therebetween (see FIG. 3). Facings 38 are fixed to cushioning plates 37 which are fixed to the radially outer portion of the clutch plate 24. The facings 38 are faced to a flywheel (not shown) of a engine and a pressure plate (not shown) near a clutch case.

Figure 4:
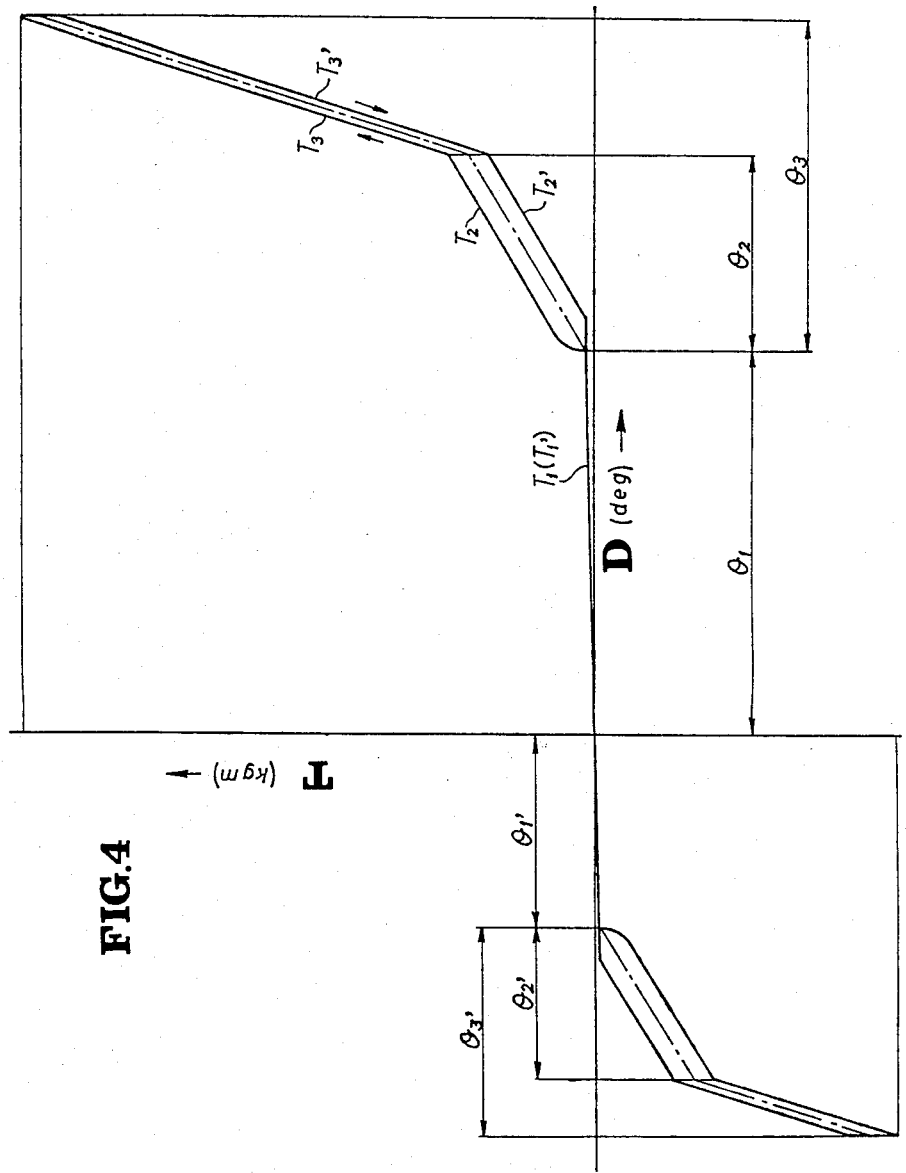
FIG. 4 is a graph showing the torsion characteristic.

Operation is as follows. In order to transmit rotational force of the engine to wheel drive shafts, the facings 38 of the disc is pressed to the flywheel, so that the force or torque is transmitted to the drive shafts through the clutch shaft engaged to the splined hub 1. However, in order to simplify explanation, following operation is described as if the torque was transmitted to the facings 38 from the splined hub 1. Since the sub-plates 13 are connected to the retaining and clutch plates 23 and 24 through the strong second springs 27, the first spring 18 is compressed during initial torsion operation. Torque along an arrow A loaded to the spring hub 1 is transmitted to the facings 38 through the inner flange 3, the first spring 18, the sub-plates 13, the second springs 27, the clutch plate 24 and the cushioning plates 37. Since the first spring 18 is weak and soft, the rate of increase of torsional torque T with respect to increase of torsion angle D is small as shown in a line $T_1$ in FIG. 4. When the torsion angle D reaches a value of $\theta_1$, the spaces 7 in FIG. 3 between the outer teeth 5 and the inner teeth 6 decrease to zero (0), and the teeth 5 contact with the teeth 6, so that the inner flange 3 is fixedly engaged with the outer flange 4 and the sub-plates 13. The flanges 3 and 4 and the sub-plates 13 move together thereafter, and the second springs 27 start to be compressed ($T_2$ in FIG. 4). When the outer flange 4 turns an angle of $\theta_2$ thereafter, the spaces 32 decrease to zero, and the end faces 30a of the openings 30 contact with the ends of the third springs 31, thus, the third springs 31 start to be compressed. When the flange 4 rotates an angle of $\theta_3$, the stop pins 25 contact with the end faces 36a of the openings 36, so that all members of the disc are connected integrally together, and the torsion angle reaches a maximum value. First hysteresis torque is caused by friction between the sub-plates 13 and the inner flange 3. Second and third hysteresis torque are caused by friction between the sub-plates 13 and the clutch plate 24 as well as the retaining plate 23. The second hysteresis starts to occur at the initial area of the second torsion operation $T_2$. While the torsion angle decreases from the maximum value, the torsion torque decreases as shown in lines $T_3'$, $T_2'$, $T_1'$ in FIG. 4. Since the first hysteresis is very small, both kinds of torque $T_1$, $T_1'$ are illustrated in the same line in FIG. 4. Left half of FIG. 4 shows characteristic when the angle changes in the minus (negative) area.

According to the invention, as described hereinbefore, a radial flange of the splined hub 1 is divided to the inner flange 3 on the hub 1 and the outer flange 4, and both flanges 3 and 4 mesh with each other with the circumferential spaces 7 and 7' therebetween. The sub-plates 13 are fixed to the both sides of the flange 4. The weak torsion spring 18 is arranged in the openings 17 and 19 axially registered and formed in the sub-plates 13 and the inner flange 3. The sub-plates 13 are pressed to both side faces of the flange 3. The axially outside faces opposite to the flange 3 of the sub-plates 13 are faced to the retaining plate 23 and the clutch plate 24 with the friction members 22 therebetween. The outer portions of the clutch and retaining plates 24 and 23 supported by the splined hub 1 are connected together by the stop pins 25 in order to press the friction members 22. The strong torsion springs 27 and 31 are arranged in the openings 26, 28, 29, 30, 33 and 34 axially registered and formed in the flange 4, the plate 23 and the plate 24. Therefore, spaces corresponding to the first torsion angle of $\theta_1$ are unnecessary to be formed at both disc circumferential ends of the openings 26 for the second springs 27, whereby circumferential length of each openings 26 can be reduced. Further, the spaces 32 and 32' for the third springs 31 correspond to the difference ($\theta_2$) between the degree ($\theta_1+\theta_2$) at which the third torsion operation starts and the degree ($\theta_1$) at which the second torsion operation starts. Also, the spaces for the stop pins 25 correspond to the difference between the maximum torsion angle of ($\theta_1+\theta_3$) and the first torsion angle of $\theta_1$. Therefore, total circumferential length of the openings formed in the outer flange 4 can be reduced, and enough spaces for springs can be obtained. Thus, the strength of the flange can remarkably be increased, and the torque transmitting capacity can be increased.

Furthermore, the first spring 18 is compressed the short length corresponding to the first torsion angle of $\theta_1$ at most, and the most desirable characteristic for the first spring 18 can be selected without taking long compression into consideration. Also, wear and damage of the first spring 18 can be prevented to a large extent. In conclusion, according to the invention, enough spaces for the torsion springs can be obtained without reducing the strength of the flange, so that the maximum torsion angle can be increased. Also, hysteresis can be changeable.

In a modification of the invention, very strong springs can be employed as last springs, i.e., the third springs 31, so as to eliminate the stop pins. Openings for the stop pins 25 may be formed in the edges of the openings 26 and 30.

Although the invention has been described in its preferred form with a certain degree of particularity, it is understood that the present disclosure of the preferred form may been changed in the details of construction and the combination and arrangement of parts may be resorted to without departing from the spirit and scope of the invention as hereinafter claimed.

What is claimed:

1. A clutch disc comprising:
   a splined hub;
   an inner flange projecting radially from the outer periphery of said hub;
   an outer flange arranged around and meshed with said inner flange but separated therefrom to provide a circumferential space therebetween;
   a pair of sub-plates fitted at their inner periphery to said hub, one of said sub-plates being fixed to each side face of said outer flange to support said flange on said hub, radially inner portions of said sub-plates being pressed to frictionally engage both side faces of said inner flange;
   said sub-plates and said inner flange being formed with axially registered openings therein and having a weak torsion spring arranged in said axially registered openings;
   a retaining plate and a clutch plate faced to axially outside faces of said sub-plates opposite to said flange;
   friction members positioned about said hub between said sub-plates and said retaining plate and clutch plate, respectively, said retaining plate and said clutch plate being connected together by pins so as to load pressure against said friction members and being supported by said hub;

said outer flange, said retaining plate and said clutch plate being formed with axially registered openings therein; and strong torsion springs arranged in said openings formed in said outer flange, retaining plate and clutch plate.

2. A clutch disc comprising:

a splined hub;

an inner flange formed with outer teeth projecting radially from the outer periphery of said hub;

an outer flange formed with inner teeth arranged around and meshed with said outer teeth of said said inner flange but separated therefrom to provide a circumferential space therebetween;

a pair of sub-plates fitted at their inner periphery to said hub, one of said sub-plates being fixed to each side face of said outer flange to support said flange on said hub, radially inner portions of said sub-plates being pressed to frictionally engage both side faces of said inner flange;

said sub-plates and said inner flange being formed with axially registered openings therein and having a weak torsion spring arranged in said axially registered openings;

a retaining plate and a clutch plate faced to axially outside faces of said sub-plates opposite to said flange;

friction members positioned about said hub between said sub-plates and said retaining plate and clutch plate, respectively, said retaining plate and said clutch plate being connected together by pins so as to load pressure against said friction members and being supported by said hub;

said outer flange, said retaining plate and said clutch plate being formed with axially registered openings therein; and strong torsion springs arranged in said openings formed in said outer flange, retaining plate and clutch plate.

3. A clutch disc comprising:

a splined hub;

an inner flange formed with outer teeth projecting radially from the outer periphery of said hub;

an outer flange formed with inner teeth arranged around and meshed with said outer teeth of said said inner flange but separated therefrom to provide a circumferential space therebetween;

a pair of sub-plates fitted at their inner periphery to said hub, one of said sub-plates being fixed to each side face of said outer flange to support said flange on said hub, radially inner portions of said sub-plates being pressed to frictionally engage both side faces of said inner flange;

said sub-plates and said inner flange being formed with axially registered openings therein and having a weak torsion spring arranged in said axially registered openings, said opening in said inner flange being formed within one of said outer teeth;

a retaining plate and a clutch plate faced to axially outside faces of said sub-plates opposite to said flange;

friction members positioned about said hub between said sub-plates and said retaining plate and clutch plate, respectively, said retaining plate and said clutch plate being connected together by pins so as to load pressure against said friction members and being supported by said hub;

said outer flange, said retaining plate and said clutch plate being formed with axially registered openings therein; and strong torsion springs arranged in said openings formed in said outer flange, retaining plate and clutch plate.

4. A clutch disc comprising:

a splined hub;

an inner flange formed with outer teeth projecting radially from the outer periphery of said hub;

an outer flange formed with inner teeth arranged around and meshed with said outer teeth of said said inner flange but separated therefrom to provide a circumferential space therebetween;

a pair of sub-plates fitted at their inner periphery to said hub, one of said sub-plates being fixed to each side face of said outer flange to support said flange on said hub, radially inner portions of said sub-plates being pressed to frictionally engage both side faces of said inner flange;

said sub-plates and said inner flange being formed with axially registered openings therein and having a weak torsion spring arranged in said axially registered openings, said opening in said inner flange being formed within one of said outer teeth;

a retaining plate and a clutch plate faced to axially outside faces of said sub-plates opposite to said flange;

friction members positioned about said hub between said sub-plates and said retaining plate and clutch plate, respectively, said retaining plate and said clutch plate being connected together by pins so as to load pressure against said friction members and being supported by said hub;

said outer flange, said retaining plate and said clutch plate being formed with axially registered openings therein and having strong torsion springs arranged in said openings;

one of said openings in said outer flange extending radially inwardly to the inner periphery of said outer flange, and said outer tooth of said inner flange which contains said opening for said weak torsion spring extending radially outwardly into said one of said openings.

* * * * *